United States Patent
Meyer et al.

(10) Patent No.: US 9,534,586 B2
(45) Date of Patent: Jan. 3, 2017

(54) DEVICE FOR MEASURING DEFORMATIONS OF A ROTOR BLADE AND METHOD FOR INSTALLING SUCH A DEVICE

(71) Applicant: DR. JOHANNES HEIDENHAIN GmbH, Traunreut (DE)

(72) Inventors: Hermann Meyer, Schneizlreuth (DE); Thomas Sigl, Stephanskirchen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/854,063

(22) Filed: Sep. 15, 2015

(65) Prior Publication Data

US 2016/0076523 A1 Mar. 17, 2016

(30) Foreign Application Priority Data

Sep. 16, 2014 (DE) .......... 10 2014 218 518

(51) Int. Cl.
*G01L 1/04* (2006.01)
*F03D 11/00* (2006.01)
(Continued)

(52) U.S. Cl.
CPC .......... *F03D 11/0091* (2013.01); *F03D 1/0675* (2013.01); *F03D 17/00* (2016.05);
(Continued)

(58) Field of Classification Search
CPC .... G01L 1/04; G01L 3/24; B60R 2021/01516; F03D 11/0091; B29C 66/90
(Continued)

(56) References Cited

U.S. PATENT DOCUMENTS

| 8,482,247 B2 * | 7/2013 | Lechte | ........ F03D 11/00 |
| | | | 320/101 |
| 2015/0135859 A1 * | 5/2015 | Meyer | ........ F03D 11/0091 |
| | | | 73/862.624 |

FOREIGN PATENT DOCUMENTS

| CH | 127311 A | 8/1928 |
| CH | 151371 A | 12/1931 |

(Continued)

OTHER PUBLICATIONS

WO 2013/045610 A1 (SKF AB [SE]; Long Joerg [DE]; Liesegang Hansjuergen [DE]; Loren Schei) Apr. 4, 2013 (Apr. 4, 2013).*
U.S. Appl. No. 14/542,675, filed Nov. 17, 2014.

*Primary Examiner* — Lisa Caputo
*Assistant Examiner* — Nigel Plumb
(74) *Attorney, Agent, or Firm* — Leydig, Voit & Mayer, Ltd.

(57) ABSTRACT

A device for measuring deformations of a rotor blade of a wind turbine generator system includes a position-measuring device having a first assembly and a second assembly. The first assembly is disposed so as to be movable relative to the second assembly. The position-measuring device is configured to measure a relative position between the first and second assemblies. An arm mechanically coupled to the first assembly has a first adhesive bonding surface configured to allow the arm to be permanently joined to the rotor blade. The second assembly has a second adhesive bonding surface configured to allow the second assembly to be permanently joined to the rotor blade. A first mounting element is fixed to at the second assembly and/or the arm. A second mounting element is adhesively attachable to the rotor blade. The first mounting element is detachably joinable to the second mounting element.

9 Claims, 4 Drawing Sheets

(51) Int. Cl.
  *G01M 5/00* (2006.01)
  *G01B 5/30* (2006.01)
  *F03D 1/06* (2006.01)

(52) U.S. Cl.
  CPC .............. *F03D 80/00* (2016.05); *G01B 5/30* (2013.01); *G01L 1/04* (2013.01); *G01M 5/0016* (2013.01); *G01M 5/0058* (2013.01); *F05B 2270/331* (2013.01); *F05B 2270/808* (2013.01); *Y02E 10/721* (2013.01)

(58) Field of Classification Search
  USPC ................ 73/862.621, 862.381, 862; 156/64
  See application file for complete search history.

(56) References Cited

FOREIGN PATENT DOCUMENTS

| | | |
|---|---|---|
| DE | 29720741 U1 | 5/1998 |
| DE | 19847982 A1 | 6/1999 |
| EP | 2876406 A1 | 5/2015 |
| FR | 2487503 A2 | 1/1982 |
| FR | 2665527 A2 | 2/1992 |
| WO | WO 2013045610 A1 | 4/2013 |

\* cited by examiner

DEVICE FOR MEASURING DEFORMATIONS OF A ROTOR BLADE AND METHOD FOR INSTALLING SUCH A DEVICE

CROSS-REFERENCE TO PRIOR APPLICATION

Priority is claimed to German Patent Application No. DE 10 2014 218 518.1, filed on Sep. 16, 2014, the entire disclosure of which is hereby incorporated by reference herein

FIELD

The present invention relates to a device for measuring deformations of a rotor blade of a wind turbine generator system, as well as to a corresponding method for installing such a device.

Rotor blades of wind turbine generator systems are subject to a variety of different forces that naturally lead to deformations of the rotor blades and may excite them into vibration. The weight force of a rotating rotor blade alone produces a periodic deformation of the rotor blade in question. These deformations are superimposed by further deformations which result, inter alia, from the aerodynamic loads. For example, the aerodynamic loads depend on the vertical profile of the wind velocity in combination with wind gusts or wind turbulences. Moreover, a pulsating force is introduced into the rotor blade each time the blade passes through the wind shade in front of the tower. At any rate, it is difficult to predict the magnitude of the deformations of rotor blades of a wind turbine generator system, which is why current efforts are directed to measuring these as actual values.

With regard to predicting fatigue damage, it may be advantageous, at a desired point in time, to generate information retrospectively about an accumulated loading on the rotor blade on the basis of the measured deformations, respectively loads. Thus, the availability of such load values is significant with regard to short-term maximum loads or the expected fatigue damage. Moreover, by taking the actual deformations, respectively actual loads into consideration, it is possible to optimize the control of the wind turbine generator system, for example, by adjusting the pitch angles.

BACKGROUND

German Patent Application DE 19847982 A1 describes a device for measuring vibrations of a rotor blade of a wind turbine generator system, which device is capable of ascertaining deformation of the rotor blade using a distance sensor as a linear element. Elements of the device are attached to a rotor wall by an adhesive joint. The above-mentioned patent application notes at the outset that adhesive joints require considerable mechanical skill and effort for retrofitting them on existing rotor blades.

SUMMARY

In an embodiment, the present invention provides a device for measuring deformations of a rotor blade of a wind turbine generator system including a position-measuring device having a first assembly and a second assembly. The first assembly is disposed so as to be movable relative to the second assembly. The position-measuring device is configured to measure a relative position between the first and second assemblies. An arm mechanically coupled to the first assembly has a first adhesive bonding surface configured to allow the arm to be permanently joined to the rotor blade at the first adhesive bonding surface. The second assembly has a second adhesive bonding surface configured to allow the second assembly to be permanently joined to the rotor blade. A first mounting element is fixed to at least one of the second assembly and the arm. A second mounting element is adhesively attachable to the rotor blade. The first mounting element is detachably joinable to the second mounting element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a device for measuring deformations of a rotor blade of a wind turbine generator system, which device can be relatively easily and precisely installed on the rotor blade, particularly also under restricted space conditions and in difficult mounting positions.

In another embodiment, the present invention provides a method for easy and precise installation of such a device on a rotor blade.

The device for measuring deformations of a rotor blade of a wind turbine generator system according to an embodiment of the present invention includes a position-measuring device having a first and a second assembly, as well as an arm. The first assembly of the position-measuring device is disposed to be movable relative to the second assembly, respectively rotatable about an axis, the position-measuring device being capable of measuring the relative position between the first and second assemblies. The arm is mechanically coupled to the first assembly and has a first adhesive bonding surface configured to allow the arm to be permanently joined, respectively adhesively bonded, to the rotor blade at this first adhesive bonding surface. The second assembly has a second adhesive bonding surface configured to allow the second assembly to be permanently joined, respectively adhesively bonded, to the rotor blade. A first mounting element is fixed to the second assembly and/or to the arm. The device for measuring deformations of a rotor blade further has a second mounting element, the first mounting element being detachably joinable to the second mounting element, and the second mounting element being configured to be adhesively attachable to the rotor blade.

Thus, the device for measuring deformations of a rotor blade includes at least one pair of mounting elements including the first mounting element and the second mounting element. Naturally, a certain force is required to release the pair of mounting elements, or, if the device has a plurality of pairs of mounting elements, to release the plurality of pairs. The mounting elements are advantageously configured such that the force required for release is greater than the weight force of the device for measuring deformations of a rotor blade. This allows the device to be mounted overhead to the rotor blade without any additional aids.

In a further embodiment of the present invention, the second mounting element has an adhesive layer by means of which the second mounting element can be adhesively attached to the rotor blade. The adhesive force exerted by the adhesive layer or by the adhesive layers, if there are a plurality of adhesive layers, is advantageously also greater than the weight force of the device for measuring deformations of a rotor blade.

In an embodiment of the present invention, the first mounting element is detachably joinable to the second mounting element by a hook and loop type fastener such as Velcro-type mechanism. Accordingly, the mounting elements are configured as hook and loop fastening elements such as Velcro-type elements, it being possible for the cooperating first and second mounting elements to have mushroom-head elements or hooks and loops. Alternatively, the mounting elements may have a combination of mushroom-head elements and loop elements.

Advantageously, the first assembly is disposed to be rotatable relative to the second assembly about an axis. The relative angular position between the first and second assemblies can then be measured by the position-measuring device, which may also be referred to as angle-measuring device in this case. The first adhesive bonding surface is disposed at a distance from the second adhesive bonding surface. The arm is mechanically coupled to the first assembly at a radial distance from the axis, so that a relative angular displacement can be produced between the first and second assemblies in response to a change in the distance.

Even when a connecting line between the first adhesive bonding surface and the second adhesive bonding surface does not extend strictly orthogonally to the axis, it is nevertheless possible to ascertain a distance that is orthogonal to the axis, as long as the connecting line between the first and second adhesive bonding surfaces does not extend exactly parallel to the axis. Accordingly, the formulation, whereby the distance is orthogonal to the axis, is understood to mean that a connecting line between the first and second adhesive bonding surfaces has a directional component (in accordance with the distance normal to the axis direction) that is oriented orthogonally to the axis.

The arm is advantageously fabricated from a material that includes plastic. In particular, the plastic may be fiber-reinforced, for example glass fiber- and/or carbon fiber-reinforced.

In a further embodiment of the present invention, the first assembly is articulated to the arm, in particular, via a flexible component that may be in the form of a flexure bearing or one-piece bearing.

The position-measuring device advantageously has one or more rolling element bearings for supporting the first assembly rotatably relative to the second assembly. This type of bearing arrangement is then also used for guiding the arm.

Alternatively, a plain bearing or a flexure bearing may also be used for supporting the first assembly rotatably relative to the second assembly.

In an embodiment of the present invention, the position-measuring device has a measuring standard and an element for scanning the same. The measuring standard may have an annular shape and, considered geometrically, is then a hollow cylinder having circumferential curved surfaces. The curved surfaces may be of low height, so that the measuring standard is configured as an annular disk having parallel annular end faces which may also be referred to as base or top surfaces. The angular scale or angle code may be applied to one of the end faces.

Especially when the measuring standard is configured in such a way that the curved surfaces have a comparatively greater height; i.e., in the case of a rather drum-shaped measuring standard, the angular scale may be applied to the curved surface. However, the measuring standard may also be configured as a measuring tape which may be attached to the inner or outer curved surface of a cylindrical body.

In addition, the measuring standard may be configured to have a scale only over a limited angular range; i.e., may not extend over 360°, but rather have only an angular segment as a measuring range. The angular extent of the measuring standard may be matched to the maximum measurement range or angular travel.

Alternatively, the position-measuring device may have a measuring standard and an element for scanning the same that are adapted to measure a linear displacement relative to each other. Accordingly, the measuring standard may have a linear shape and be attached to arm or directly applied thereto.

The element for scanning the measuring standard is advantageously designed to be photosensitive or light-sensitive. Accordingly, this type of scanning is based on an optical principle.

Alternatively, the scanning may be based on an inductive or magnetic principle.

The position-measuring device may, in particular, deliver digital position signals and/or signals that have been generated by differentiating the position signals over time, once or repeatedly. The signals in question may be transmitted purely digitally and serially, which allows for relatively simple processing of the signals, for example, for integration in a highly dynamic control.

The position-measuring device advantageously features a measuring standard having an absolute code, so that the position-measuring device can measure the relative position (angular position or linear displacement) between the first and second assemblies as an absolute value (in contrast to an incremental measurement). In this manner, the absolute deformation of the rotor blade may be measured at any desired points in time. This is particularly advantageous for inspecting the settlement processes in the rotor blade structure. For such an inspection, the rotor blade is moved to a horizontal position while out of operation. The deformation is subsequently measured in this position. If an absolute position measuring device is used, the absolute measurement value may be directly compared to the preceding (likewise absolute) measurements.

Another embodiment of the present invention provides a rotor blade of a wind turbine generator system having a device for measuring deformations. This device in turn includes a position-measuring device having a first and a second assembly, as well as an arm. The first assembly of the position-measuring device is disposed to be movable relative to the second assembly, respectively rotatable about an axis, the position-measuring device being capable of measuring the relative position between the first and second assemblies. The arm is mechanically coupled to the first assembly and has a first adhesive bonding surface, the arm being permanently joined to the rotor blade at this first adhesive bonding surface. The second assembly has a second adhesive bonding surface by means of which the second assembly is permanently joined to the rotor blade. A first mounting element is fixed to the second assembly and/or to the arm. The device for measuring deformations of a rotor blade further has a second mounting element, the first mounting element being detachably joinable to the second mounting element, and the second mounting element being configured to be adhesively attached to the rotor blade.

In a further embodiment of the rotor blade, the rotor blade has a plurality of devices for measuring deformations.

The arm is advantageously oriented in the longitudinal direction of the rotor blade, the rotor blade (at least in the root area thereof) having a central longitudinal axis extending in the longitudinal direction.

If the position-measuring device takes the form of an angle-measuring device, the axis (of rotation) of the position-measuring device may be oriented substantially orthogonally to the longitudinal direction of the rotor blade. Moreover, the position-measuring device may be disposed such that the axis is oriented substantially parallel to the inner wall of the rotor blade, or in such a way that the axis is oriented substantially orthogonally to the inner wall of the rotor blade. Accordingly, the arm is oriented in the longitudinal direction of the rotor blade, and the axis (or rotation) of the position-measuring device is oriented tangentially or radially relative to the longitudinal direction of the rotor blade. In particular, the tangential or radial orientation is relative to a circular arc whose center point comes to rest on the longitudinal axis of the rotor blade.

In addition, the device for measuring deformations may be installed at the root of the rotor blade; i.e., in the vicinity of the rotor blade connection at the hub of the wind turbine generator system. Thus, the second assembly may be mounted in the region of the blade connection at a hub.

In a further embodiment of the present invention, the arm, respectively the material that it is made of, has the same coefficient of thermal expansion as the rotor blade, respectively the material thereof.

The rotor blade advantageously has a plurality of devices for measuring deformations. After logically and/or arithmetically combining the signals generated by the individual devices, a spatial deformation of the rotor blade may be determined from the respective signals.

In an embodiment, the present invention provides a method for installing a device for measuring deformations of a rotor blade of a wind turbine generator system. The method for installing the device described includes the following steps:
   attaching the second mounting element to the rotor blade,
   applying an adhesive to the first and second adhesive bonding surfaces,
   attaching the device to the rotor blade by joining the first mounting element and the second mounting element together, the adhesive being in contact with both the first and second adhesive bonding surfaces, as well as with the rotor blade.

The second mounting element advantageously has an adhesive layer allowing it to be adhesively attached to the rotor blade. The second mounting element is detachably joined to the first mounting element prior to being attached to the rotor blade. Prior to applying the adhesive, the device is pressed onto the rotor blade such that the second mounting element adheres to the rotor blade via the adhesive layer,
   the device is removed from the rotor blade again for subsequent application of the adhesive.

After applying the adhesive, the device is reattached to the rotor blade by joining the first mounting element and the second mounting element together, the adhesive being in contact with both the first and second adhesive bonding surfaces, as well as with the rotor blade. Thus, the device is configured such that a predetermined thickness of the adhesive layer will always be reproducibly obtained.

Figure 1:
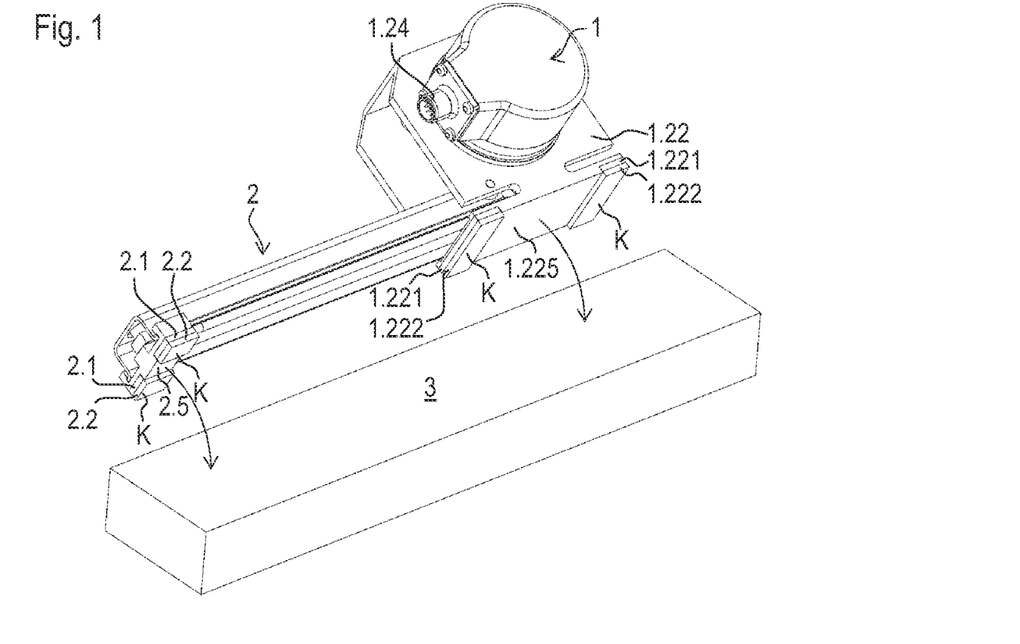
FIG. 1 is a perspective view showing the device for measuring deformations of a rotor blade in a first mounting phase.

FIG. 1 shows a device for measuring deformations of a rotor blade 3 of a wind turbine generator system. In FIGS. 1 through 4, only a rectangular cuboidal portion of rotor blade 3 is shown. In the exemplary embodiment presented here, rotor blade 3 in question is a component of a wind turbine generator system having a horizontal axis and, in particular, having a total of three rotor blades 3. The device in question for measuring deformations of rotor blade 3 includes a position-measuring device 1, here an angle-measuring device, and an arm 2.

The position-measuring device 1 shown here includes a first assembly 1.1 and a second assembly 1.2. First assembly 1.1 has a shaft 1.11 including a shoulder (FIG. 4) to which a measuring standard 1.14 is joined, for example by an adhesive, permanently and only with small tolerance deviations, centrically relative to an axis A. Axis A extends in the y-direction. In the exemplary embodiment presented here, measuring standard 1.14 is made of glass and has an annular shape. Inherently, it has two end faces, an angular scale being applied to one of them. The angular scale may be configured as an incremental graduation, for example, having radially oriented scale graduation marks. However, additionally or alternatively, an absolute code may also be provided.

Figure 4:
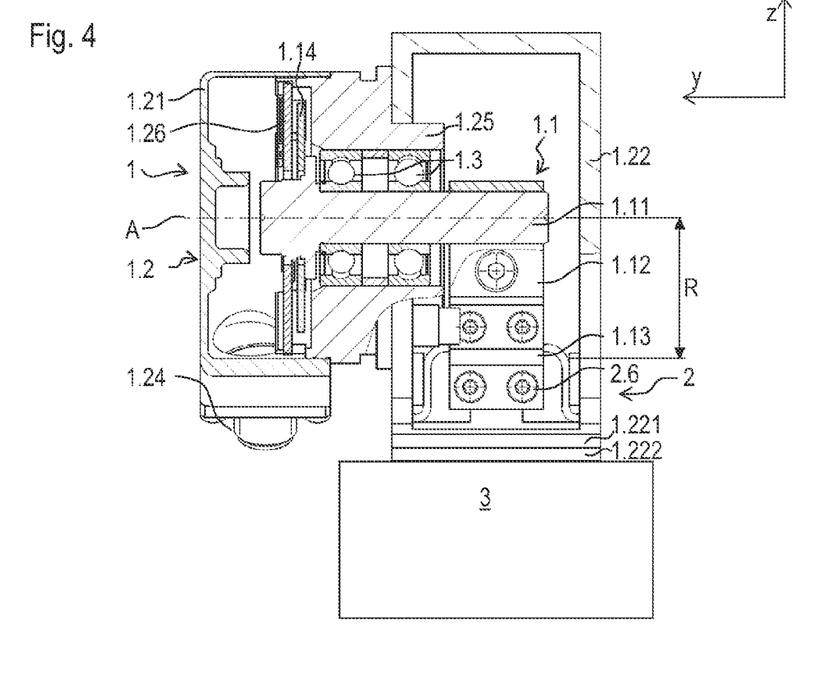
FIG. 4 is a sectional view of the device for measuring deformations of a rotor blade.

A driver 1.12 is non-rotatably clamped to shaft 1.11, so that an angular displacement of shaft 1.11 may be generated in response to movement of driver 1.12. Driver 1.12 may be associated with first assembly 1.1 Precisely fixed to driver 1.12 is a component 1.13 which serves as a flexure bearing and, accordingly, has a flexible design. In particular, component 1.13 may be configured as a thin-walled, small steel plate.

In accordance with FIG. 4, shaft 1.11 is rotatably supported by two rolling element bearings 1.3 within a body 1.25 associated with second assembly 1.2. Also associated with second assembly 1.2 is a light source that includes an LED and a collimator lens, for example, so that collimated light is emitted by the light source. This light is transmitted through measuring standard 1.14, respectively the angular scaling thereof, and is modulated in accordance with the angular position between first assembly 1.1 and second assembly 1.2, respectively shaft 1.11 and body 1.25. The modulated light is scanned by a scanning device 1.26 that is attached to body 1.25. Corresponding light-sensitive or photosensitive detectors are located on scanning device 1.26, which is configured as a populated circuit board. Scanning device 1.26 also includes, inter alia, electronic signal-shaping components, for example, for amplifying and digitizing the scanning signals delivered by the detectors.

Figure 5:
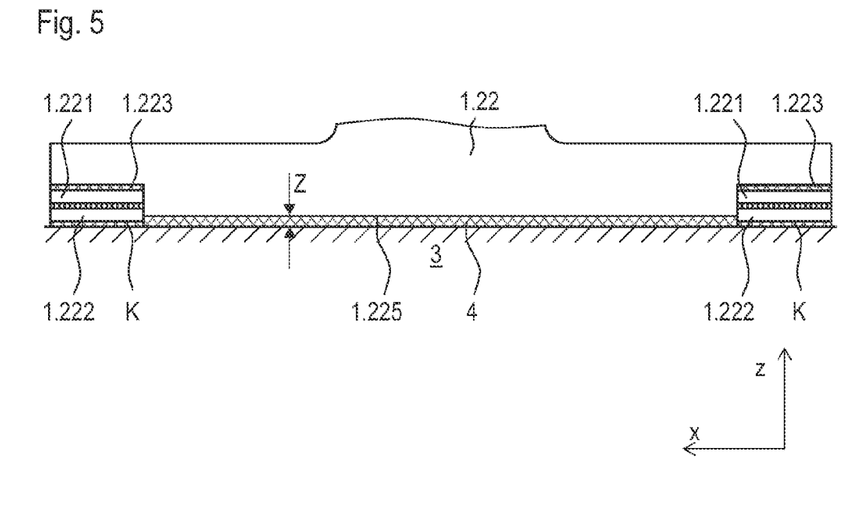
FIG. 5 is a side view of a detail of the device.

Mounted around scanning device 1.26 is a housing 1.21, so that, inter alia, the light source, measuring standard 1.14, and scanning device 1.26 are protected from environmental influences. A holder 1.22 is attached to body 1.25. This holder 1.22 has a second adhesive bonding surface 1.225 (see FIG. 1) for adhesively bonding holder 1.22 permanently to rotor blade 3. In addition, first mounting elements 1.221 are attached to holder 1.22. In the exemplary embodiment presented here, first mounting elements 1.221 are configured as Velcro-type elements and permanently joined to holder 1.22 by means of an adhesive layer 1.223 (FIG. 5).

Each first mounting element 1.221 has one second mounting element 1.222 detachably attached thereto. In the exemplary embodiment presented here, second mounting elements 1.222 are also configured as Velcro-type elements, so that first mounting elements 1.221 and second mounting elements 1.222 are respectively joined together by a Velcro-type connection. Second mounting element 1.222 have an adhesive layer K on their faces facing away from first mounting elements 1.221. During transport of the device for measuring deformations of a rotor blade 3, protective films are disposed on these faces for protecting adhesive layer K.

An electrical connection is established between position-measuring device 1 and subsequent electronics via a connecting cable that is connected to a socket 1.24, thereby allowing electrical signals and electrical power to be transmitted between the subsequent electronics and position-measuring device 1.

Thus, the relative angular position between first assembly 1.1 and second assembly 1.2, respectively between shaft 1.11 and body 1.25, may be determined by position-measuring device 1. Position-measuring devices 1 of this kind are frequently referred to as rotary encoders.

Besides position-measuring device 1, the device for measuring deformations includes arm 2. In the exemplary embodiment presented here, the arm is fabricated from fiberglass reinforced plastic and has a first adhesive bonding surface 2.5 (see FIG. 1) and a second connection point 2.6. In the exemplary embodiment, second connection point 2.6 is an abutment surface on which component 1.13 is mounted by screw connections, for example.

First adhesive bonding surface 2.5 of arm 2 is configured for adhesively bonding arm 2 permanently to rotor blade 3. Furthermore, first mounting elements 2.1 are attached to arm 2. In the exemplary embodiment presented here, first mounting elements 2.1 are configured as Velcro-type elements. First mounting elements 2.1 of arm 2 are also permanently joined to arm 2 by means of an adhesive layer (similar to the attachment of first mounting elements 1.221 to holder 1.22).

Each first mounting element 2.1 of arm 2 has one second mounting element 2.2 of arm 2 detachably attached thereto. In the exemplary embodiment presented here, second mounting elements 2.2 of arm 2 are also configured as Velcro-type elements, so that first mounting elements 2.1 and second mounting elements 2.2 are respectively joined together by a Velcro-type connection. Second mounting elements 2.2 of arm 2 have an adhesive layer K on their faces facing away from first mounting elements 2.1. During transport of the device for measuring deformations of a rotor blade 3, protective films are disposed on these faces for protecting adhesive layer K.

As is arm 2, rotor blade 3 is fabricated from fiberglass reinforced plastic.

In the course of installing the device for measuring deformations of a rotor blade 3 of a wind turbine generator system, initially the protective films are removed from second mounting elements 1.222, 2.2, thereby exposing the faces of second mounting elements 1.222, 2.2 that are provided with adhesive layer K. This mounting phase is illustrated in FIG. 1. Then, the device is placed onto the suitably prepared surface at the root of the rotor blade (3), so that second mounting elements 1.222, 2.2 adhere to the surface of rotor blade 3.

Next, the device is removed from rotor blade (3) in such a way that second mounting elements 1.222, 2.2 remain adhered to the surface of rotor blade 3 while second mounting elements 1.222, 2.2 are separated from first mounting elements 1.221, 2.1. Accordingly, in the exemplary embodiment presented here, provision is made, in particular, to release the Velcro-type connections between second mounting elements 1.222, 2.2 and first mounting elements 1.221, 2.1. Thus, the holding forces provided by adhesive layers K are of a magnitude that allows the Velcro-type connection to be released, respectively pulled off, without detaching second mounting elements 1.222, 2.2 from rotor blade 3.

The device composed of position-measuring device 1 including holder 1.22, as well as arm 2, may then be put down. Next, adhesive, here a two-component adhesive is applied to first and second adhesive bonding surfaces 2.5, 1.225 (between the respective first mounting elements 1.221, 2.1), thereby creating adhesive layers 4 and 5. In order to obtain an adhesive bond that is of the quality required for the measurement purposes, the adhesive must be applied over the entire in question area without bubbles.

Figure 2:
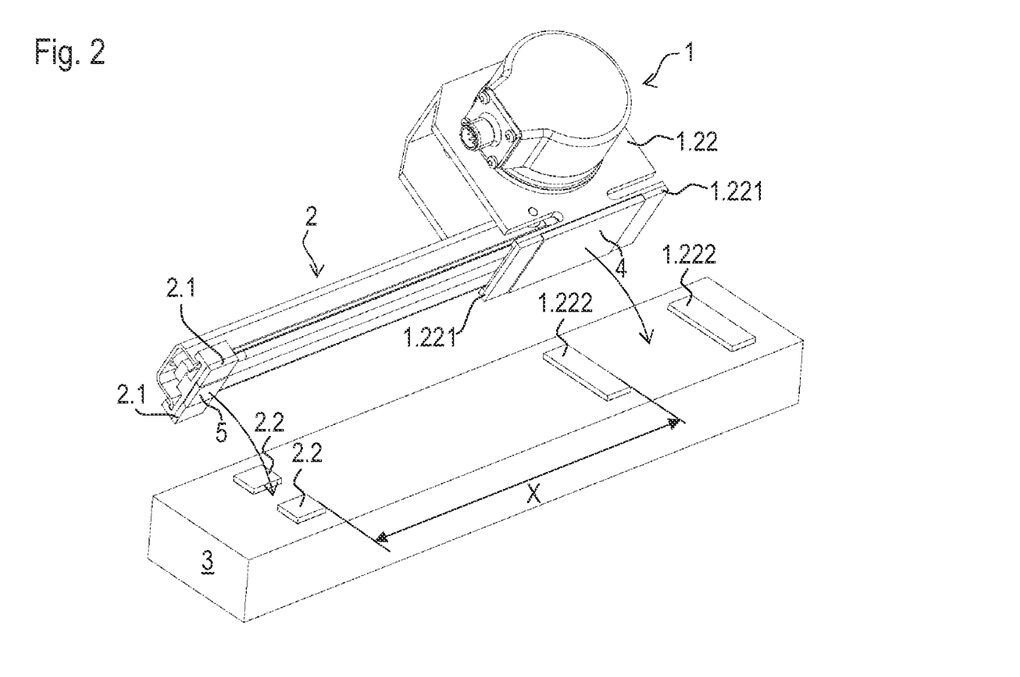
FIG. 2 is a perspective view showing the device for measuring deformations of a rotor blade in a second mounting phase.
Figure 3:
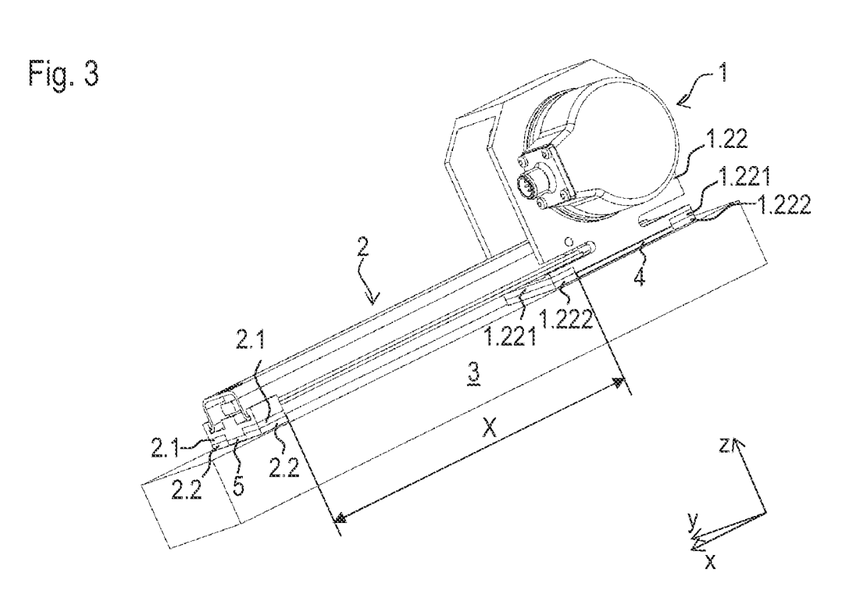
FIG. 3 is a perspective view showing the device for measuring deformations of a rotor blade in a third mounting phase.

Subsequently, first mounting elements 1.221, 2.1 are joined to second mounting elements 1.222, 2.2 in accordance with FIG. 2, thereby bringing the device for measuring deformations into a final position relative to rotor blade 3. The device for measuring deformations is retained by the holding forces of mounting elements 1.222, 2.2, here by the Velcro-type connections, even when the device is mounted overhead. The adhesive in adhesive layers 4, 5 can harden without any further action by the installer. After this mounting step, no further actions are necessary, particularly since immovable connections between holder 1.22 and rotor blade 3, as well as between arm 2 and rotor blade 3, already exist before the hardening of adhesive layers 4, 5 after the first and second mounting elements 2.1, 1.221, 2.2, 1.222 are joined together.

Furthermore, holder 1.22, adhesive layers 1.223, and first and second mounting elements 1.221, 1.222, including adhesive layers K, are dimensioned such that an exact predetermined thickness Z of adhesive layer 4 is created once mounting elements 1.221, 1.222 are joined together (FIG. 5). The same also applies to the configuration of arm 2 and its first and second mounting elements 2.1, 2.2 with regard to adhesive layer 5. Thus, using the present invention, an exact thickness Z of adhesive layers 4, 5 can be reproducibly obtained in a simple manner, regardless of the particular mounting position of the device.

Once the installation is complete, arm 2 is oriented to extend in the x-direction, the x-direction corresponding substantially to the longitudinal axis $\xi$ (FIG. 6) of rotor blade 3. Thus, the first connection point of arm 2; i.e., here first adhesive bonding surface 2.5, is located at a distance X from second adhesive bonding surface 1.225 of second assembly 1.2, distance X being oriented orthogonally to axis A. Arm 2 is mechanically coupled, in particular articulated, to position-measuring device 1 at radial distance R relative to axis A. In this manner, a change in distance X, for example in response to an elongation or a contraction of rotor blade 3, may generate a relative angular displacement between first and second assemblies 1.1, 1.2.

By configuring component 1.13 as a thin-walled, small steel plate, it is possible to reduce bending moments in the device without unfavorably influencing the measuring accuracy. Component 1.13 is dimensioned such that its flexibility is matched to the required torque, respectively moment of resistance, of the position-measuring device.

Figure 6:
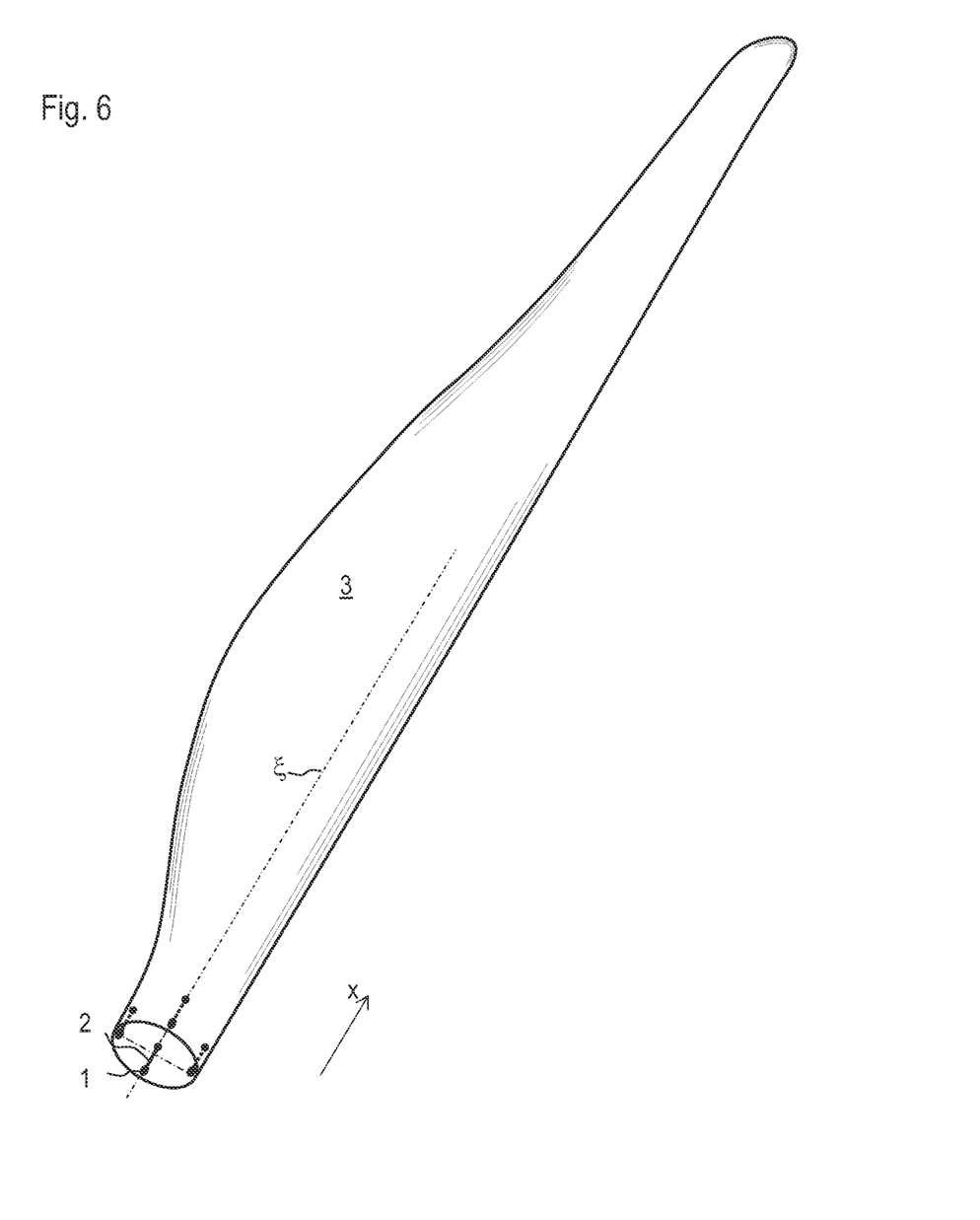
FIG. 6 is a schematic view showing a rotor blade having devices for measuring deformations.

To be able to draw conclusions about the deformation of rotor blade 3 in all dimensions, it is advantageous when a plurality, for example four, of such devices for measuring deformations are installed in the root of rotor blade 3, as illustrated in FIG. 6. The four devices for measuring deformations are arranged, preferably in the four principal bending directions, around the circumference of the root of a rotor blade 3 in such a way that they are offset 90° from one another.

The method and device according to the present invention make it possible to retrofit rotor blades with a device for measuring deformations in a simple manner. In order to be able to reliably and accurately determine the deformations, it is important that the devices be carefully adhesively bonded to rotor blade 3. The present invention allows such devices to be adhesively bonded in a relatively simple and precise manner, even under restricted space conditions and in difficult mounting positions (including even overhead installation).

During operation of the wind turbine generator system, rotor blades 3 are deformed by their own weight and by aerodynamic loads. In particular, the loads lead to elongations or compressions of rotor blade 3 in the x-direction. The distance between second adhesive bonding surface 1.225 and first adhesive bonding surface 2.5 changes in proportion thereto. For instance, if distance X is approximately 500 mm, the distance between first and second adhesive bonding surfaces 2.5, 1.225 changes by approximately 0.5 mm under normal loads. If R is dimensioned to be 30 mm, for instance, this leads to an angular displacement between first assembly 1.1 and second assembly 1.2 of approximately 1°. The position-measuring device 1 described above, which operates in accordance with a precise optical principle, has a resolution of 25 bits, for example, for one rotation (360°). Based on the mentioned geometric boundary conditions, this corresponds to a resolution of 5.6 nm with respect to the changes in the length of distance X between first adhesive bonding surface 2.5 and second adhesive bonding surface 1.225.

The device for measuring deformations of a rotor blade 3 is naturally subject to substantial temperature fluctuations in a wind turbine generator system. Nevertheless, even under these adverse ambient conditions, exceptionally high measurement accuracies can be attained using the above-described device for measuring deformations. The reason for this, on the one hand, is that because angular positions are measured, the thermal expansion of measuring standard 1.14 hardly plays a role (the distances between the graduation lines and the width thereof vary with temperature, but not the angular position). On the other hand, arm 2 and rotor blade 3 are manufactured from the same material, so that both have the same thermal expansion properties. Finally, the pot-shaped, electrically conductive housing 1.21 makes it possible to ensure an optimal overvoltage protection, in particular for scanning device 1.26 and the associated electronics, in the case of electrical storms, for example.

The signals that may be output via socket 1.24 are advantageously fully digital, making it possible for the subsequent electronics mentioned above to process the signals from all devices for measuring deformations of the rotor blades without further digitization. On the one hand, this ensures a signal transmission that is reliably protected against external disturbances. On the other hand, the signals may be processed relatively simply, making it possible for the measured deformations to be used in a closed-loop control circuit, for example for (separately) controlling the pitch angle for each rotor blade 3.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for measuring deformations of a rotor blade of a wind turbine generator system, the device comprising:
    a position-measuring device having a first assembly and a second assembly, the first assembly being disposed so as to be rotatable relative to the second assembly about an axis, the position-measuring device being configured to measure a relative angular position between the first and second assemblies;
    an arm mechanically coupled to the first assembly and having a first adhesive bonding surface configured to allow the arm to be permanently joined to the rotor blade at the first adhesive bonding surface, the second assembly having a second adhesive bonding surface configured to allow the second assembly to be permanently joined to the rotor blade, the first adhesive bonding surface being disposed at a distance (X) from the second adhesive bonding surface in a direction of extension of the arm, the arm being mechanically coupled to the first assembly at a radial distance such that a relative angular displacement is producible between the first and second assemblies in response to a change in the distance (X);
    a first mounting element fixed to at least one of the second assembly and the arm; and
    a second mounting element that is adhesively attachable to the rotor blade, the first mounting element being detachably joinable to the second mounting element.

2. The device as recited in claim 1, wherein the second mounting element has an adhesive layer configured to adhesively attach the second mounting element to the rotor blade.

3. The device as recited in claim 1, wherein the first mounting element is detachably joinable to the second mounting element by a hook and loop fastener.

4. The device as recited in claim 1, wherein the first assembly is articulated to the arm via a flexible component.

5. The device as recited in claim 1, wherein the position-measuring device has a measuring standard and an element configured to scan the measuring standard.

6. The device as recited in claim 5, wherein the element configured to scan the measuring standard is photosensitive.

7. A method for installing a device for measuring deformations to a rotor blade, the method:
providing the device, the device comprising:
- a position-measuring device having a first assembly and a second assembly, the first assembly being disposed so as to be movable relative to the second assembly, the position-measuring device being configured to measure a relative position between the first and second assemblies;
- an arm mechanically coupled to the first assembly and having a first adhesive bonding surface configured to allow the arm to be permanently joined to the rotor blade at the first adhesive bonding surface, the second assembly having a second adhesive bonding surface configured to allow the second assembly to be permanently joined to the rotor blade;
- a first mounting element fixed to at least one of the second assembly and the arm; and
- a second mounting element that is adhesively attachable to the rotor blade, the first mounting element being detachably joinable to the second mounting element, attaching the second mounting element to the rotor blade; then applying an adhesive to the first and second adhesive bonding surfaces; and then attaching the device to the rotor blade by joining the first mounting element fixed on the device and the second mounting element attached to the rotor blade together, the adhesive being in contact with both the first and second adhesive bonding surfaces, as well as with the rotor blade.

8. The method as recited in claim 7, wherein the second mounting element has an adhesive layer configured to adhesively attach the second mounting element to the rotor blade, the method, after providing the device and prior to applying the adhesive, further comprising:
- detachably joining the second mounting element to the first mounting element prior to the second mounting element being attached to the rotor blade;
- pressing the device onto the rotor blade such that the second mounting element adheres to the rotor blade, and
- removing the device from the rotor blade for subsequent application of the adhesive.

9. The method as recited in claim 7, wherein the first mounting element and the second mounting element are directly joined to each other.

* * * * *